Oct. 23, 1934.   R. GROETCHEN   1,978,395
VENDING MACHINE
Filed April 23, 1934   3 Sheets-Sheet 1
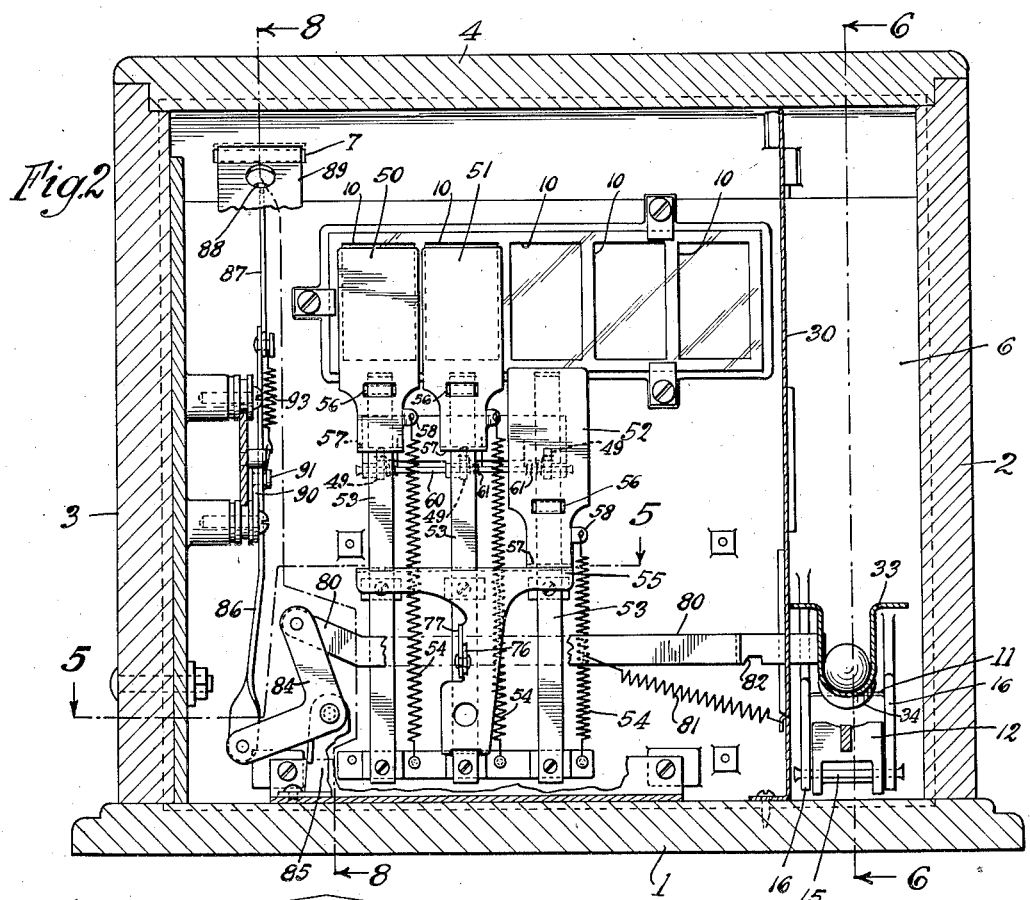
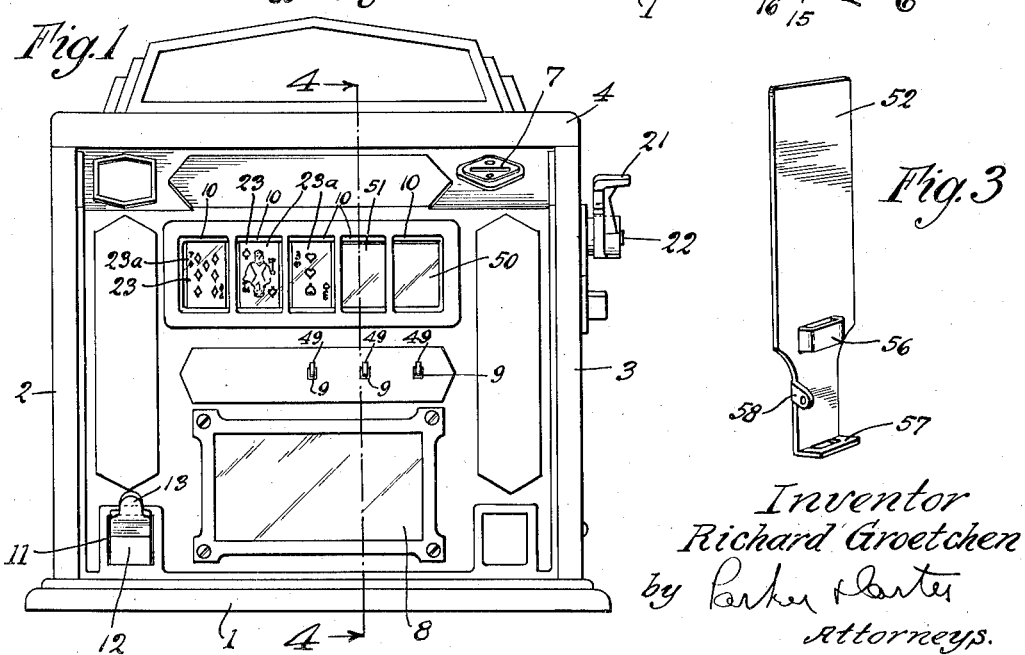
Inventor
Richard Groetchen
by Parker & Carter
Attorneys.

Oct. 23, 1934.  R. GROETCHEN  1,978,395
VENDING MACHINE
Filed April 23, 1934   3 Sheets-Sheet 2

Inventor
Richard Groetchen
by Parker &c.
Attorneys.

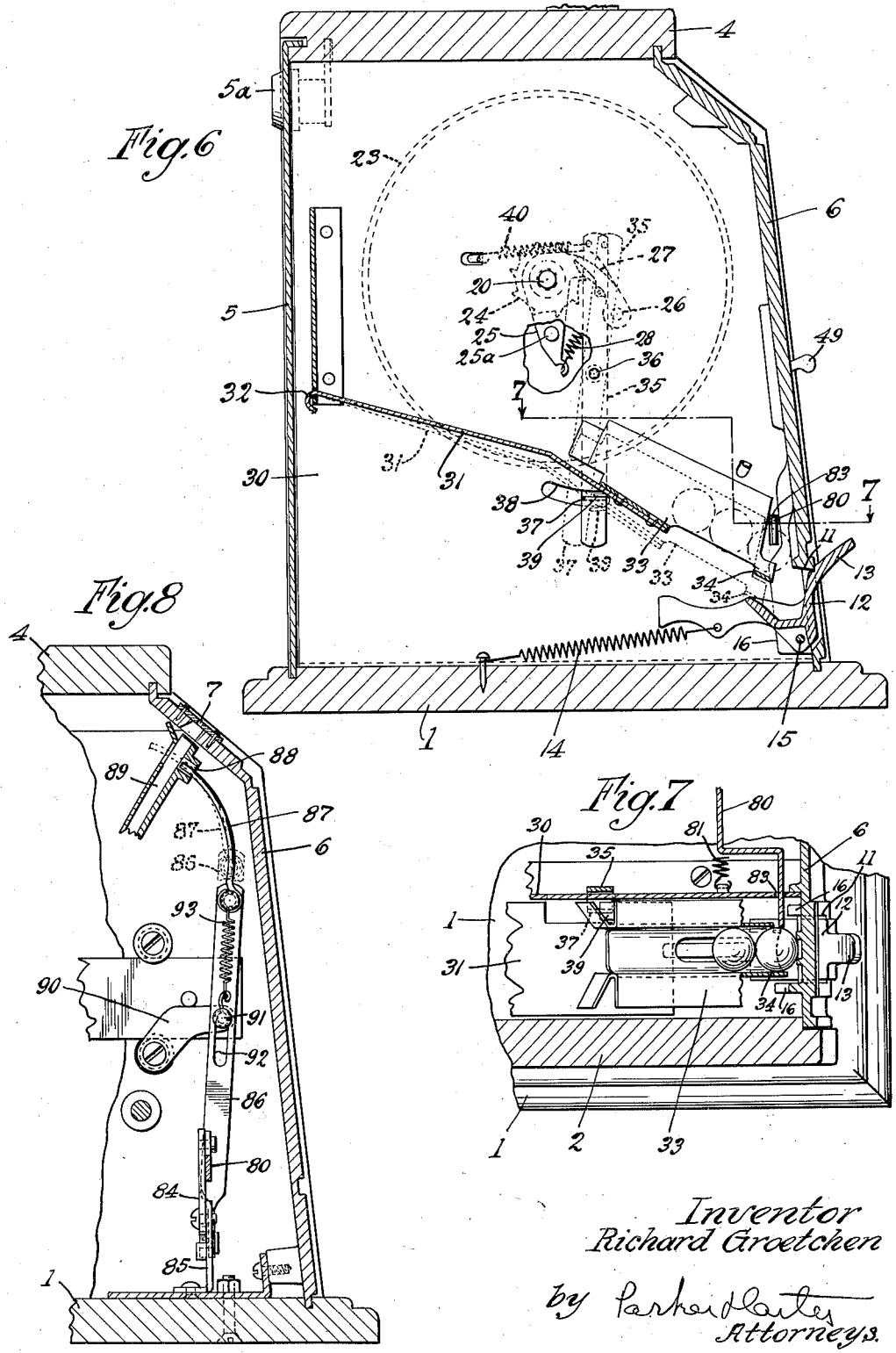

Patented Oct. 23, 1934

1,978,395

UNITED STATES PATENT OFFICE 1,978,395

VENDING MACHINE

Richard Groetchen, Chicago, Ill.

Application April 23, 1934, Serial No. 721,879

7 Claims. (Cl. 273—143)

My invention relates to an improvement in vending devices. It has for one purpose the dispensation of articles to be vended such as gum balls, candy or the like. Another object is the provision of a game device in connection with a vending device and operable in association with the dispensation of the articles sold. Other objects will appear from time to time in the course of the specification and claims.

I illustrate my invention more or less diagrammatically in the accompanying drawings, wherein—

Figure 1 is a front elevation;

Figure 2 is a vertical transverse section taken adjacent the front panel of the device illustrated in Figure 1;

Figure 3 is a detail;

Figure 6 is a section on the line 6—6 of Figure 2;

Figure 7 is a section on the line 7—7 of Figure 6; and

Figure 8 is a section on the line 8—8 of Figure 2.

Like parts are indicated by like symbols throughout the specification and drawings.

Figure 4:
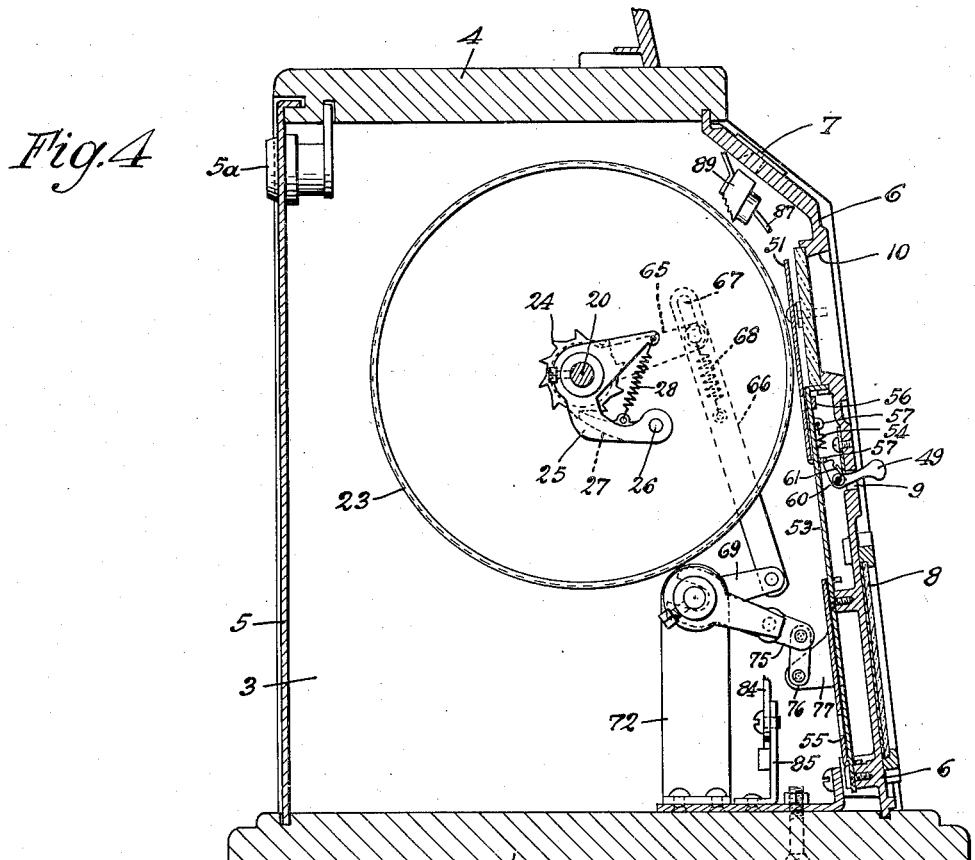
Figure 4 is a section on the line 4—4 of Figure 1.
Figure 5:
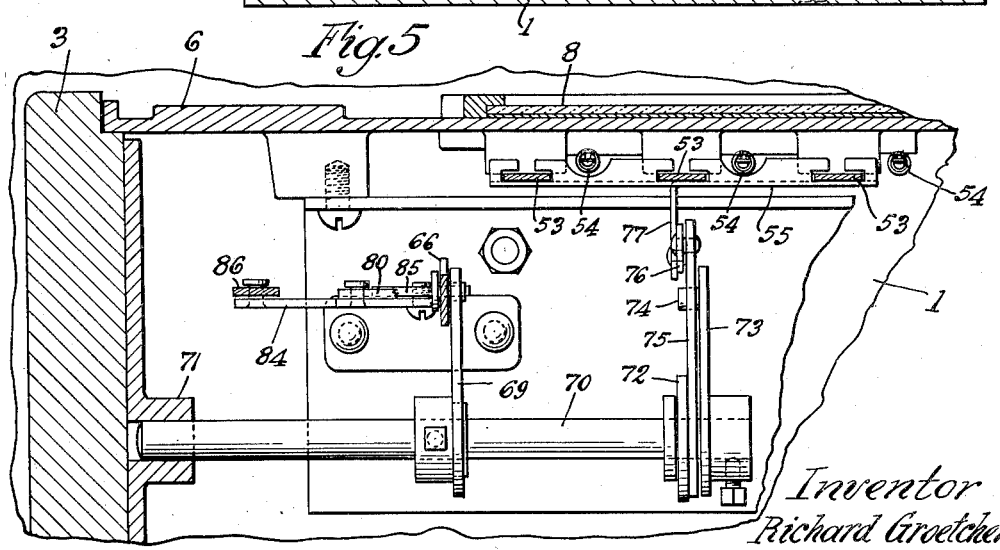
Figure 5 is an enlarged section along the line 5—5 of Figure 2.

Referring to the drawings, 1 generally indicates any suitable base or bottom portion, upon which may be superposed a cabinet which includes the side wall members 2, 3, the top 4, the removable rear closure 5 and the front panel structure generally indicated as 6. Any suitable lock is provided for the rear panel 5 illustrated, for example, as at 5a, but the details thereof form no part of the present invention.

Referring in greater detail to the front panel 6 it is provided with a coin inlet 7, a display window 8 behind which the rules or instructions may be positioned, a plurality of lever apertures 9, a plurality of windows 10, herein indicated as separate but which if desired might be replaced by a single window, and a dispensing aperture 11 for the gum or other article dispensed which is closed by a structure 12 which serves as a combined shutter and dispensing member. It may be manually moved into open or dispensing position as by the handle 13 but it is normally held in the closed position in which it is shown in Figure 6 as by the spring 14. It is shown as pivoted as at 15 to any suitable lug or the like 16 on the front panel 6.

Mounted in any suitable way within the machine or housing formed by the walls 2, 3, 4, 5 and 6, is a shaft 20 the details of the shaft and its mounting not shown in detail. An exterior handle 21 is provided, pivoted as at 22 and any suitable means, not herein shown in detail may be interposed between the lever 21 and the shaft 20 whereby in response to actuation of the lever 21 the shaft 20 is oscillated. Mounted upon the shaft 20 are a plurality of drums 23. Each of these drums is provided on its periphery with a plurality of indicating symbols which may, for example, be in the form or design of playing card faces as shown at 23a through the windows 10. Any suitable means may be interposed between these drums and the shaft 20 whereby, in response to oscillation of the shaft 20 the drums are caused to rotate. As an instance of such rotation causing means I illustrate ratchets 24, one for each drum, mounted on the drum. Adjacent each drum is a bracket 25 mounted on the shaft 20 and held against rotation in relation to the shaft 20. Pivoted to each such bracket as at 26 is a dog 27 which is urged as by the spring 28, into contact with the ratchet. It will be observed, as in comparing Figures 4 and 6, that some of the ratchets face in one direction and some in the other. I may, for example, have three face in one direction and two in the other. Therefore, when the shaft 20 is given an oscillation or partial rotation, being moved in one direction by movement of the lever 21 and being moved in the opposite direction by any suitable returning spring or mechanism, the partial rotation of the shaft in one direction imparts rotation to, say, two of the drums, and the return rotation in the opposite direction may return, say, the other three.

Adjacent the end of the drum series is a partition 30 which may serve as a closure for receiving the gum or other articles to be dispensed. The compartment formed between the end member 2 and this intermediate partition 30 has a false bottom 31 which may be pivoted as at 32 and which terminates in a delivery chute 33 with an end portion 34 adapted to be engaged by the dispensing container 12. This structure is normally held in the full line position in which it is shown in Figure 6 as by a lever 35 which is pivoted as at 36 and which is provided with an offset portion 37 which extends through a slot 38 in the partition 30 and engages a projection 39 on the member 31. The spring 40 normally keeps the lever 35 in the full line position in which it is shown in Figure 6, holding the member 33 in the position in which it is there shown in full line. It will be understood that when a coin is inserted in the device and the lever 21 is actuated, the lever 35 is moved into the dotted line position, which permits the member 31 to drop into the dotted line position, referring to both members as they are shown in Figure 6. This action is obtained through the pin 25a on the end bracket 25, which pin 25a engages the upper portion of the lever 35 in response to rotation of the shaft 20 and thus of the bracket 25 which rotates with the shaft. A piece of gum then drops into the container 12. When the purchaser presses down on the lever or handle 13 he rotates the member about the pivot 15, which has for effect to thrust the member 33 up again into the full line position. Then the spring 40 acts to snap the lever 35 back into holding position. The customer removes the single article from the container 12 and the spring 14 then throws the container into the full line position of Figure 6.

In connection with the vending feature, the purchaser may play a game, the game serving to attract or interest a purchaser. Referring, for example, to Figure 1, I illustrate five windows, 10. The number of windows may be greater or less or a single window may be employed, but I find it convenient to have separate windows, one for each of the drums 23. Illustrated in Figure 1 are three levers 49. These levers serve as actuating means for a shutter mechanism, below described.

Referring to Figure 2, I provide three shutters 50, 51 and 52. Each shutter is slidable on a guide 53 and is normally urged into downward or open position, as by the spring 54. Any suitable movement limiting member may be employed, indicated for example as 55, for limiting the downward movement of the shutters in response to the springs 54. The individual shutters are illustrated as in Figure 3 and are provided with a plurality of eyes 56, 57 through which the guides 53 may pass. 58 are lugs to which the springs 54 may be secured. It will be understood that whereas I have shown downwardly moving shutters I do not wish to be so limited, except so far as I limit myself in my claims to any particular shutter or shutter structure. The shutters may be slidably mounted or may be hinged or may be moved upwardly or downwardly. I illustrate, however, a satisfactory solution of the problem.

It will be observed, as in Figures 2 and 4, that the levers 49 are rotatably mounted upon a shaft 60. Associated with each of the levers 49 is a coil spring 61 which tends to rotate the lever into the locking position in which it is shown in Figure 4. In this position the lever is opposed to the lip 57 of the shutter 51 and serves to hold the shutter in closed position. When the operator presses down on the lever he moves it, against the spring 61, into unlocking position, out of line with the lip 57. The spring 54 then snaps the shutter down into the open position. Referring to Figure 2 the two left hand shutters 50, 51, are shown in closed position, whereas the shutter 52 has been raised, upon the lever 49 and has been drawn by the spring 54 into open position.

In order to move the shutters into closed position before each sale I provide the following mechanism. Mounted on the shaft 20 is a lever 65 to which is pivoted a link 66 with a lost motion slot 67 and spring 68, the details of which are not of themselves important. The link 66 is pivoted at the bottom to a lever 69 which lever is keyed or otherwise secured to a shaft 70 which is rotatably mounted in bearings 71, 72. Secured to the shaft 70 is an additional lever 73 having a pin 74 which engages an additional forked lever 75. To the end of the forked lever 75 is secured a link 76 which in turn is pivoted to a lug 77 associated with the limit member 55. This limit member 55 is slidable on the guides 53. It will be understood that when the device is actuated by the lever 21 and a partial rotation is given the shaft 20 this rotation acts, through the above described mechanism, to lift the member 55 and therefore to thrust the shutters 50, 51 and 52 into topmost position. When so upwardly thrust they are caught by the levers 49 and locked in upper or closed position. The limit member 55 then drops back into its bottom position but the shutters are left locked. Then the operator can successively and individually release these shutters at will, by manipulating one or all of the levers 49.

I provide the following device for preventing a manipulation of the game feature except in connection with a sale or rather, for locking it out of use when the last article has been dispensed. I indicate as at 80 a bar which is aligned with the delivery chute 33, as shown in Figures 2 and 6. This bar is normally out of line with the delivery of articles through the chute, it being kept in that position by the articles dispensed themselves. It will be seen in Figure 2 as abutting against one of the pieces of gum or candy balls to be dispensed. When the last ball has been dispensed the spring 81 becomes effective to move the bar 80 to the right, referring to the position of the parts in Figure 2 until the notch 82 seats in the aperture 83 of the partition 30. The bar 80 then drops down and is locked against further movement. A bell crank lever 84 is pivoted to the opposite end of the bar 80, being mounted on a bracket 85. At its opposite arm it is pivoted to a bar 86. Pivoted to the upper end of the bar is a curved rod 87 which passes through an aperture 88 into the coin chute 89 which coin chute is in line with the coin inlet 7. The bar 86 is guided by a link 90 having a pin 91 penetrating a slot 92 in the bar. This permits the bar 86 to be raised up and down. The spring 93 is provided which has for effect to withdraw the bar 86 when the position of the bar 80 permits. It will be understood that when the last piece of gum has been dispensed the bar 80 moves to the right, referring to Figure 2 and this in turn raises the bar 86 and thrusts its extension 87 across the coin inlet, so that the operator cannot insert a coin. In other words, when the last piece of gum or candy has been dispensed the device is put out of operation until the person caring for the machine opens it and re-fills the dispensing compartment with gum or candy and manually re-sets the bar 80 by pushing it into the position in which it is shown in full line in Figure 2.

It will be realized that whereas I have described and shown a practical and operative device, nevertheless many changes might be made in the size, shape, number and disposition of parts without departing from the spirit of my invention. I therefore wish my description and drawings to be taken as in a broad sense illustrative and diagrammatic rather than as limiting me to my specific showing. In particular, it will be understood that I may employ a greater or a less number of shutters or windows or drums. Whereas I do not wish to be limited to any particular arrangement or type of symbols on the drums I find it practical to employ a group of five wheels or drums, each drum having on it a series of impressions of the usual playing cards. In the machine now being manufactured it happens that there are ten cards on each drum, but the number of cards per drum and the details of the cards can be varied to suit any particular condition or game.

The use and operation of my invention are as follows:

The device is a vending machine and a supply of gum or candy is maintained in it. The user inserts a coin and presses down on the lever 21. This imparts to the shaft 20 an oscillation or partial rotation in one direction, with an ensuing return in the opposite direction. This has several results. In the first place, it actuates the lever 35 and permits the dispensing trough 33 to drop into dispensing position, dropping a ball of candy or gum into the dispensing container 12. There is room for only one such article in the container and the user, when he presses down on the lever 13 to release this article, of necessity lifts the trough 33 from the dotted line into the full line position and permits the lever 35 to snap back into holding position, so that but one article is dispensed for each coin. The actuation of the shaft 20 has for further effect to impart rotation to the five drums. Some may be rotated in one direction and some in another, or, if desired, all could be rotated in the same direction. In any case, they all finally come to rest, leaving a single playing card impression aligned with each of the windows 10. The separation between adjacent windows are of course unnecessary although convenient and what is essential is that all five impressions shall be simultaneously aligned with some aperture or apertures for observation. In the form of the game and dispensing device herein the rotation of the shaft 20 has for further effect to lift closing shutters 50, 51 and 52 into alignment with three of the windows 10. Two playing cards are exposed and three are masked. The operator, in the course of playing any game he is interested in, can successively or simultaneously actuate the levers 49 and thus release one, two or all of the shutters to see what symbols are disclosed beneath. As soon as the supply of articles to be vended is used up the bar 80 is moved by the spring 81 into locking position, which has for function to prevent the insertion of any further coins. But as the member 87 prevents the insertion of coins into the machine, the machine cannot be actuated and is entirely out of use until the user again fills it up and manually resets the rod 80.

I claim:

1. In a game and vending device, a plurality of wheels and means for rotating them, each wheel having a plurality of indicating symbols thereon, window means aligned with said wheels and adapted for the simultaneous display of one symbol on each said wheel, shutter means adapted to mask a plurality of said windows, means for moving said shutter means into window masking position in response to the initial actuation of the game device, and means for thereafter opening said shutter means to disclose the symbols aligned with said windows.

2. In a game and vending device, a plurality of wheels and means for rotating them, each wheel having a plurality of indicating symbols thereon, window means aligned with said wheels and adapted for the simultaneous display of one symbol on each said wheel, shutter means adapted to mask a plurality of said windows, means for moving said shutter means into window masking position in response to the initial actuation of the game device, and means for thereafter opening the individual shutter means to disclose the symbols aligned with said windows, including individual releasing means for each shutter.

3. In a game and vending device, a housing, window means in said housing, a plurality of drums rotatably mounted within said housing, a shaft upon which said drums are rotatably mounted, means for imparting a rotary oscillation to said shaft, means for imparting rotation of said drums in response to said oscillation of said shaft, said drums having symbols adapted to be aligned with said window means, shutter means for said window means, means for closing said shutter means in response to rotary oscillation of said shaft, and manually operable means for opening said shutter means.

4. In a game and vending device, a housing, window means in said housing, a plurality of drums rotatably mounted within said housing, said drums having symbols adapted to be aligned with said window means, shutter means for said window means, means for imparting rotation to said drums in response to the insertion of a coin into said vending device, means, operable unitarily therewith, for initially moving said shutter means to closing position, and manually operable means for opening said shutter means.

5. In a game and vending device, a housing, window means in said housing, a plurality of drums rotatably mounted within said housing, said drums having symbols adapted to be aligned with said window means, shutter means for said window means, means for imparting rotation to said drums in response to the insertion of a coin into said vending device, means, operable unitarily therewith, for initially moving said shutter means to closing position, and manually operable means for opening said shutter means, said device including a plurality of individual shutters opposed to the individual drums, and separate manually operable means for the individual shutters.

6. In a game and vending device, a plurality of movable members, each having a plurality of indicating symbols thereon, window means and means for aligning one symbol on each said members with said window means, shutter means masking a plurality of said symbols, and means for opening said shutter means to disclose said symbols, the device including individual shutters opposed to the individual movable members, means for normally holding the shutters in closed position, after they have been initially set in said closed position, and means for individually releasing said shutters, and unitary means for initially imparting movement to the movable members and for moving the shutters into closed position.

7. In a game and vending device, a plurality of movable members, each having a plurality of indicating symbols thereon, window means and means for aligning one symbol on each said members with said window means, shutter means masking a plurality of said symbols, and means for opening said shutter means to disclose said symbols, the device including individual shutters opposed to the individual movable members, means for normally holding the shutters in closed position, after they have been initially set in said closed position, and means for individually releasing said shutters, said means including an individual lever for each shutter, a locking member, associated with said lever, adapted to hold the shutter in closed position, yielding means adapted normally to hold the lever and locking member in locking position, and yielding means adapted to move the shutter into open position, when the lever is manually moved into unlocking position.

RICHARD GROETCHEN.